United States Patent
Wuchner (10) Patent No.: US 9,727,329 B2
(45) Date of Patent: Aug. 8, 2017

(54) APPARATUS AND METHOD FOR MANAGING A SOFTWARE DEVELOPMENT AND MAINTENANCE SYSTEM

(71) Applicant: Egon Wuchner, Biessenhofen (DE)

(72) Inventor: Egon Wuchner, Biessenhofen (DE)

(73) Assignee: Siemens Aktiengesellschaft, München (DE)

( * ) Notice: Subject to any disclaimer, the term of this patent is extended or adjusted under 35 U.S.C. 154(b) by 118 days.

(21) Appl. No.: 14/160,555

(22) Filed: Jan. 22, 2014

(65) Prior Publication Data

US 2014/0208288 A1 Jul. 24, 2014

(30) Foreign Application Priority Data

Jan. 22, 2013 (EP) .................................... 13152114
Jul. 8, 2013 (EP) .................................... 13175529

(51) Int. Cl.
*G06F 9/44* (2006.01)
*G06F 9/45* (2006.01)
(Continued)

(52) U.S. Cl.
CPC .................. *G06F 8/70* (2013.01); *G06F 8/30* (2013.01); *G06F 11/3452* (2013.01);
(Continued)

(58) Field of Classification Search
CPC .......... G06F 8/445; G06F 8/433; G06F 8/443; G06F 8/437; G06F 9/3853; G06F 11/3636; G06F 11/0742; G06F 11/0748; G06F 11/0793; G06F 11/1417; G06F 11/1489; G06F 11/1497; G06F 11/3624; G06F 17/5022; G06F 8/65; G06F 11/3616; G06F 8/71; G06F 8/20; G06F 8/451; G06F 8/4441; G06F 8/452; G06F 8/70;
(Continued)

(56) References Cited

U.S. PATENT DOCUMENTS 5,301,312 A * 4/1994 Christopher, Jr. ... G06F 11/3616
714/32
5,319,791 A * 6/1994 Williams ................ G06F 12/10
708/520
(Continued)

FOREIGN PATENT DOCUMENTS

EP 0 924 604 A2 6/1999

OTHER PUBLICATIONS

Nachiappan Nagappan et al., Mining Metrics to Predict Component Failures, May 20-28, 2006, [Retrieved on Mar. 27, 2017]. Retrieved from the internet: <URL: http://delivery.acm.org/10.1145/1140000/1134349/p452-nagappan.pdf?> 10 Pages (452-461).*
(Continued)

*Primary Examiner* — Thuy Dao
*Assistant Examiner* — Anibal Rivera
(74) *Attorney, Agent, or Firm* — Lempia Summerfield Katz LLC (57) ABSTRACT

A management apparatus and a method for managing a software development and maintenance system are provided. In order to improve the quality and to minimize errors in a code base, an analysis of individual parts of the code base and related functional and/or architectural concerns is performed.

21 Claims, 4 Drawing Sheets (51) Int. Cl.
*G06F 11/34* (2006.01)
*G06F 11/36* (2006.01)
*G06F 17/30* (2006.01)

(52) U.S. Cl.
CPC ............ *G06F 11/3688* (2013.01); *G06F 8/71* (2013.01); *G06F 8/72* (2013.01); *G06F 17/30412* (2013.01)

(58) Field of Classification Search
CPC ..... G06F 8/66; G06F 8/72; G06F 8/61; G06F 9/45554; G06F 9/4443; G06F 9/30036; G06F 11/3452; G06F 11/366; G06F 11/0709; G06F 11/008; G06F 11/3696; G06F 11/3668; G06F 11/3688; G06F 11/3466; G06F 11/1433; G06F 11/3676; G06F 17/30412; G06F 17/5054; H04W 12/08; G06Q 10/063118
See application file for complete search history.

(56) References Cited

U.S. PATENT DOCUMENTS

| | | | | |
|---|---|---|---|---|
| 5,349,677 | A * | 9/1994 | Cray | G06F 15/8076 365/189.05 |
| 5,430,884 | A * | 7/1995 | Beard | G06F 8/433 708/520 |
| 5,481,713 | A * | 1/1996 | Wetmore | G06F 8/66 712/E9.083 |
| 6,782,468 | B1 * | 8/2004 | Nakazato | G06F 9/30036 709/213 |
| 6,816,825 | B1 * | 11/2004 | Ashar | G01R 31/318364 324/650 |
| 6,983,446 | B2 * | 1/2006 | Charisius | G06F 8/20 345/522 |
| 7,254,806 | B1 * | 8/2007 | Yates, Jr. | G06F 9/45554 712/227 |
| 7,367,007 | B1 * | 4/2008 | Sundararajan | G06F 17/5054 716/128 |
| 7,437,772 | B1 * | 10/2008 | Thenthiruperai | H04W 12/08 705/52 |
| 7,536,605 | B2 * | 5/2009 | Keaffaber | G06F 11/3688 714/25 |
| 8,159,491 | B2 * | 4/2012 | Capewell | G06F 11/3636 345/426 |
| 8,185,487 | B2 * | 5/2012 | Tuzhilin | G06F 17/30412 706/45 |
| 8,458,684 | B2 * | 6/2013 | Eichenberger | G06F 8/451 717/131 |
| 8,504,878 | B2 * | 8/2013 | Otenko | G06F 11/366 711/170 |
| 8,776,042 | B2 * | 7/2014 | Hughes | G06F 8/20 717/168 |
| 8,949,674 | B2 * | 2/2015 | Mancoridis | G06F 11/008 714/26 |
| 2003/0051232 | A1 * | 3/2003 | Lam | G06F 11/3696 717/131 |
| 2004/0230964 | A1 * | 11/2004 | Waugh | G06F 11/3616 717/168 |
| 2005/0119865 | A1 * | 6/2005 | Bartsch | G05B 23/0243 702/188 |
| 2005/0216793 | A1 * | 9/2005 | Entin | G06F 11/0709 714/38.1 |
| 2006/0015850 | A1 * | 1/2006 | Poole | G06F 8/71 717/120 |
| 2006/0101457 | A1 * | 5/2006 | Zweifel | G06F 8/65 717/174 |
| 2006/0236156 | A1 * | 10/2006 | Cunningham | G06F 11/3676 714/38.1 |
| 2006/0277442 | A1 * | 12/2006 | Lantz | G06F 11/0742 714/38.1 |
| 2007/0169113 | A1 * | 7/2007 | Moore | G06F 8/61 717/174 |
| 2008/0270849 | A1 * | 10/2008 | Connally | G01R 31/31912 714/46 |
| 2008/0270923 | A1 * | 10/2008 | Connally | G06F 9/4443 715/765 |
| 2009/0070734 | A1 * | 3/2009 | Dixon | G06F 8/71 717/102 |
| 2009/0083715 | A1 * | 3/2009 | DeWitt, Jr. | G06F 11/3466 717/128 |
| 2009/0249301 | A1 * | 10/2009 | Kalla | G06F 11/3668 717/127 |
| 2009/0313605 | A1 * | 12/2009 | Ostrand | G06F 11/008 717/124 |
| 2010/0031237 | A1 * | 2/2010 | Zlotnick | G06F 8/72 717/121 |
| 2010/0042815 | A1 * | 2/2010 | Gonion | G06F 8/4441 712/222 |
| 2010/0281466 | A1 * | 11/2010 | Remollino | G06F 11/3624 717/125 |
| 2010/0318769 | A1 * | 12/2010 | Greyzck | G06F 8/445 712/214 |
| 2011/0015898 | A1 * | 1/2011 | Klippel | H04R 29/001 702/185 |
| 2011/0214016 | A1 * | 9/2011 | Gschwind | G06F 8/443 714/16 |
| 2011/0276949 | A1 * | 11/2011 | Otenko | G06F 11/3452 717/131 |
| 2013/0074038 | A1 * | 3/2013 | Fox | G06F 8/70 717/122 |
| 2013/0145347 | A1 * | 6/2013 | Karr | G06F 8/75 717/113 |
| 2013/0212562 | A1 * | 8/2013 | Fox | G06F 8/65 717/120 |
| 2013/0339787 | A1 * | 12/2013 | Bala | G06F 11/1433 714/15 |
| 2014/0053135 | A1 * | 2/2014 | Bird | G06F 8/71 717/124 |
| 2014/0096119 | A1 * | 4/2014 | Vasudevan | G06F 8/452 717/160 |
| 2015/0161555 | A1 * | 6/2015 | Cui | G06Q 10/063118 705/7.17 |

OTHER PUBLICATIONS

Marian Jureczko et al., Towards identifying software project clusters with regard to defect prediction, 2010, [Retrieved on Mar. 27, 2017]. Retrieved from the internet: <URL: http://delivery.acm.org/10.1145/1870000/1868342/a9-jureczko.pdf??> 10 Pages (1-10).*
Extended European Search Report dated Apr. 24, 2014 for corresponding European Patent Application No. 13175529.0.

* cited by examiner

APPARATUS AND METHOD FOR MANAGING A SOFTWARE DEVELOPMENT AND MAINTENANCE SYSTEM

This application claims the benefit of EP 13152114, filed on Jan. 22, 2013, and EP 13175529, filed on Jul. 8, 2013, which are hereby incorporated by reference in their entirety.

BACKGROUND

The present embodiments relate to a managing apparatus and a managing method for managing a software development and maintenance system.

In order to handle complex software systems, an entity of a software system may be separated into a plurality of elements of a code base (e.g., source code). This simplifies the development and the maintenance of the complex software system. When a user wants to work on the code base, the required files of the code base are copied from a central storage system to a local user terminal. After the user has finished his work, the modified parts of the code base are transferred back to the central storage system, and a check-in of the modified parts of the code base is performed on the central storage system. In order to enable a tracking of the software development and to monitor the modifications, the received parts of the code base may be stored in addition to the previous version of the respective parts or sections of the code base. Thus, the amendments may be identified, and a previous version may be recovered if the current amendments would lead to a serious error in the code base. In a conventional configuration management system (CMS), code parts are stored on the basis of Directories and/or Files.

However, the users of such a complex software system are confronted with a huge amount of mainly unstructured information when maintaining and evolving the software system. Thus, the developmental quality of large software systems during development tends to decrease over time and, for example, after the first release. Currently, there are several options to analyze the system in order to identify the quality of the evolving software system and to get hints about critical issues. For example, code analysis tools allow detecting code errors on a programmatic level. Architecture analysis tools allow an analysis of the development quality of a software system like the existence of a layered structure of architecture modules. These tools also enable verification of a hierarchic and a cyclic dependency structure of architecture modules and design constructs.

Further to this, there are mechanisms and tools in place to collect customer feedback like bug reports and change requests, which are related to the functional capabilities and operational qualities like robustness or responsiveness of the software system. However, there are no mechanisms to analyze and relate these two sources of information on developmental quality and functional/operational qualities in order to get new conclusions as how and where it is worth to focus the further work on the development and maintenance of the software system.

Conventional code analysis tools only allow identifying coding pitfalls like memory leaks, buffer overruns or potential race conditions. In addition, architecture analysis tools allow identifying a non-hierarchic and cyclic dependency structure of architecture and design level. These tools provide a huge amount of information and a large set of pain points that indicate high compile times and low testability of separate units of code or architecture modules. However, it is hard to decide which critical or painful issues are to be tackled in which sequence and how these issues are to be prioritized.

Additionally, bug reports and change requests may be captured by a bug tracking tool that provides information about functional features or operational qualities of a system that do not work as expected. These reports and requests are collected and prioritized, for example, according to the severity of the reported bugs.

SUMMARY AND DESCRIPTION

The scope of the present invention is defined solely by the appended claims and is not affected to any degree by the statements within this summary.

There is a need for an apparatus and a method for a software development and maintenance system providing additional information about an interdependence between architecture concerns, functional features and implementations of the functional features. The present embodiments may obviate one or more of the drawbacks or limitations in the related art. For example, the need described above may be met by the present embodiments.

According to a first aspect, a managing apparatus for managing a software development and a maintenance system is provided. The managing apparatus includes a construct memory adapted to store a set of constructs. Each construct of the set of constructs is an element of a software code base of a software system. The managing apparatus also includes an issue memory adapted to store a set of issues. Each issue of the set of issues specifies an implementation of a software feature or an architectural concern of the software code base. The managing apparatus includes a vector generating device adapted to establish a set of vectors. Each vector of the set of vectors specifies a dependency between the stored set of constructs and at least one of the stored issues. A computing device is adapted to compute a statistical value using the established vectors. A determining device is adapted to determine a degree of interdependence between the issue using the computed statistical value. The vector generating device, the computing device, and the determining device may be formed by one or more processors.

According to a further aspect, one or more of the present embodiments provide a method for managing a software development and maintenance system. The method includes providing a set of constructs of a software code base. Each construct of the set of constructs is an element of a software code base of a software system. The method also includes providing a set of issues. Each issue of the set of issues specifies an implementation of a software feature or an architecture concern of the software code base. A set of vectors is established. Each vector of the set of vectors specifies a dependency between the provided set of constructs and at least one issue provided in the set of issues. A statistical value is computed using the established vectors, and a degree of interdependence between the issues is determined using the computed statistical value.

A relationship between feature requests, bug reports or architectural concerns (e.g., issues) and corresponding implementation (e.g., constructs) is analyzed. For this purpose, a statistical analysis between the issues and the constructs is performed, and a degree of interdependence between the issues and the constructs is computed. Such a degree of interdependence is a good basis for prioritizing the individual issues. Accordingly, the development and maintenance of the software system may be focused on the most relevant issues first.

The computed degree of interdependence also shows which constructs are most relevant. For example, based on the determined degree of interdependence, constructs that are intermingled with a huge number of issues may be identified. Accordingly, working on such a construct that is intermingled with many issues solves more than one issue in parallel.

Further to this, identifying the constructs that are intermingled with too many issues (e.g., feature-to-feature or feature-to-one-or-more-bug-fixes) may give an indication to redesign such a construct. For example, a strongly intermingled construct may be separated into a plurality of individual constructs in order to simplify the maintenance and development of the software system.

By taking into account the above-identified benefits, an automatic determination of interdependence between issues and constructs improves the quality of the software system. In this way, the time for development and maintenance of the software system may be reduced. Additionally, by identifying most relevant critical points in the source of the software system, the development of the software is guided in such a way to minimize the number of errors and to improve the software quality based on the importance of functional or operational issues (e.g., robustness), like feature implementations of architectural concerns (e.g., using error handling extensively and correctly).

In one embodiment, the management apparatus further includes a check-in device including a receiving device (e.g., a receiver) for receiving a construct and for determining issue information specifying an issue associated with the received construct. The management apparatus includes a verifying device for comparing the received construct with a version of the construct stored in the construct memory, and identifying an amendment between the received construct and a stored former version of the construct. The management apparatus also includes a tracking memory for storing the determined information specifying an issue and for storing the identified amendment between the received construct and the stored former version of the construct. The check-in device further stores the received construct in the construct memory. The check-in device and the verifying device may be formed by one or more processors.

By analyzing amendments in the constructs during a storing process and assigning each amendment to a predetermined issue, this information may be referred to in order to determine the interdependence between the constructs and the issues in an easy and efficient manner. For example, the data stored in the additional tracking memory provide a solid basis for a reliable and efficient determination of a degree of interdependence between issues and constructs.

In one embodiment, the verifying device determines the lines of code that have been added, modified and/or removed in the received construct.

A determination of the amendments based on the number of code lines in each construct is a strong indication of the complexity of an amendment that has been performed in connection with a particular issue.

In one embodiment, the receiver receives a plurality of constructs associated with a single issue, and the verifying device determines which constructs have been amended for the associated issue.

Accordingly, all constructs that are related to the associated issue may be determined, and thus, all constructs intermingled with a predetermined issue may be determined.

In one embodiment, the method for managing a software development and maintenance system further includes determining a number of constructs being affected by the respective one of the issues. The degree of interdependence is determined using the determined number of constructs being affected by the respective issue.

An analysis of the number of constructs affected by a predetermined issue is a reliable and simple indicator for specifying the complexity of an issue and for computing the interdependence between constructs and issues.

In one embodiment, a statistical correlation or a Pearson index of two established vectors is computed.

Statistical correlation and Pearson index are good indicators defining to which extent two issue implementations are intermingled to each other.

Alternatively, the computing of a statistical value includes a multiple regression analysis.

By performing a multiple regression analysis, the determination of the degree of interdependence may be extended to a plurality of the vectors in parallel, or a multiple regression analysis may be performed on more than two issue implementations at the same time in order to determine a degree of interdependence of more than two issues.

In one embodiment, each issue is a functional implementation of a feature or a bug fix.

Alternatively, each issue is an implementation of an architectural concern (e.g., error handling, persistence and/or multi-thread strategies).

In one embodiment, the set of constructs is a set of files, directories, sub-directories, namespaces, classes or class methods/functions.

One or more of the present embodiments provide a computer program product adapted to perform a method, as described above and below. The computer program product may be stored in a non-transitory computer-readable storage medium

DETAILED DESCRIPTION

Figure 1:
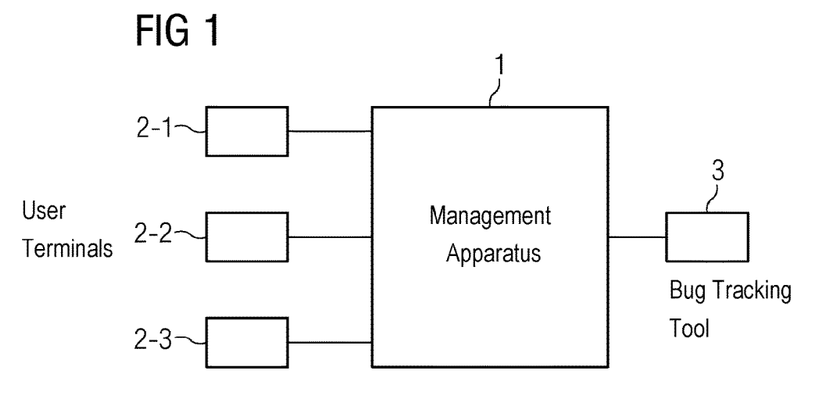
FIG. 1 shows a storage and management system for a code base of a software system according to an exemplary embodiment.

FIG. 1 shows a data storage and managing system for managing a code base of a software system. The code base of the software system may be, for example, an entity of source code of the software system. In complex software systems, this code base is separated into a plurality of constructs. A construct may be on a different granularity level. A course-granular set of constructs are architectural modules like a set of files or a set of all directories, sub-directories or namespaces of the software code base. A fine granular set of design constructs is a set of classes or the set of all class methods and functions depending on the programming language. Alternative or additional granularity levels may also be provided.

The data storage and management system includes a management apparatus 1 and a plurality of user terminals 2-*i*. Each user terminal 2-*i* may be a workplace of a user including a local computer (e.g., a PC, a notebook, a workstation, etc.). The management apparatus 1 includes a storage system for storing the complete code base of the software system. When a user wants to work on the code base, the required constructs are copied from the management apparatus to the terminal 2-*i* of the respective user. After the user has finished his work, the modified parts of the code base are transferred to the management apparatus 1, and a check-in procedure is performed on the management apparatus 1. After this check-in procedure, the modified constructs become valid elements of the software system.

To separate the development and the maintenance of the software system into a plurality of individual tasks, requests for feature implementations or bug fixers may be defined and provided to the management apparatus 1. For example, these requests may be provided by bug tracking tool 3.

Figure 2:
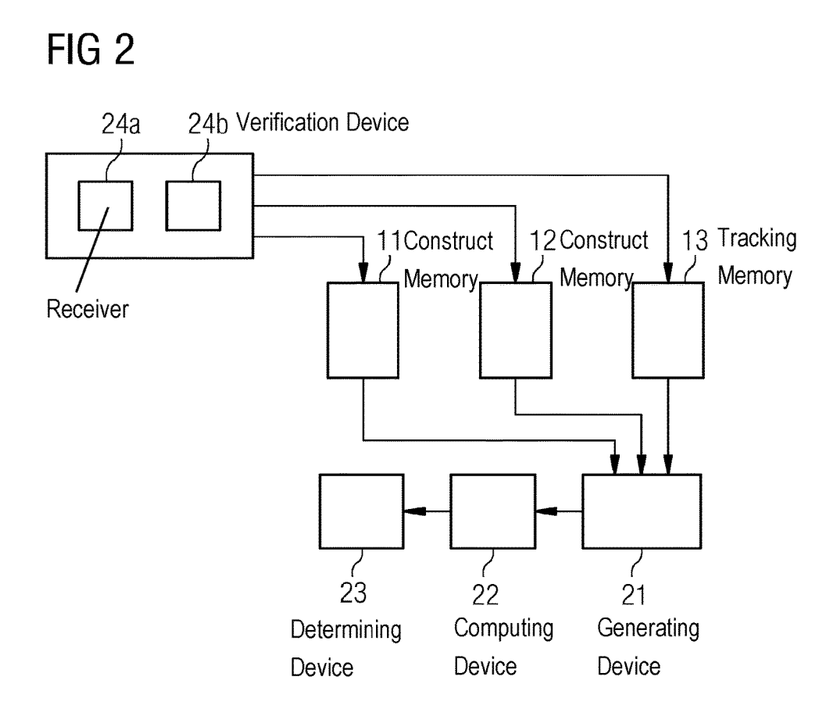
FIG. 2 shows a management apparatus according to a further exemplary embodiment.

FIG. 2 illustrates one embodiment of a management apparatus 1 for managing a software development and maintenance system in more detail. The code base of the software system is stored in a construct memory 11. This code base may include a whole source code of the software system in the respective programming language. Depending on the complexity of the software system, this code base is separated into a plurality of constructs in a hierarchical manner. Conventional configuration management systems (CMS) may store the code base of a software system separated in a plurality of files according to a file system using a hierarchical directory file structure. However, such CMS do not allow applying individual (e.g., finer) granularity levels to the code base.

In a further implementation, alternative granularity levels are applied to the code base of the software system. For the analysis of the individual code parts on a basis that is different from the granularity level used for storing the code parts according to a CMS in the construct memory 11 of the management apparatus 1, additional information may be generated specifying the code base on a different (e.g., finer) granularity level. This additional information may be stored together with the parts of the individual code base or in an additional memory (not shown).

The management apparatus 1 further includes an issue memory 12. This issue memory 12 of the management apparatus 1 stores a plurality of issues with respect to the development and maintenance of the software system. Such an issue may be, for example, a functional issue of a software system like a feature implementation or a bug fix. Further, an issue may also be the software code base including all functions, classes of the respective modules/packages, which makes up the implementation of an architectural concern like error handling, persistence (e.g., database access) or multi-threading strategies. An issue may be as simple as the whole implementation of an architectural module or component.

When a user starts working on the code base of the software system, the user reads out one or more constructs from construct memory 11 of the management apparatus 1. After the user has performed some modifications on the respective constructs, the user sends the modified constructs back to the management apparatus 1. The modified constructs are received by receiving device 24*a* (e.g., a receiver) of the check-in device 24 together with an indication of an issue that is related with the modification of the received constructs. Verification device 24*b* of check-in device 24 of the management apparatus 1 performs an analysis of the received constructs in order to identify the amendments with respect to a former version of the respective constructs stored in the construct memory 11 of the management apparatus 1. Information about the amendments identified by check-in device 24 are stored in a construct memory 12, and the relations of the respective issue and the respective amended constructs are stored in a tracking memory 13 of the management apparatus 1. Alternatively, the analysis of the amendments of the newly received constructs may also be performed in a separate task at a later time.

To identify an amendment in a construct C with respect to an issue I, reasonable variations may be provided. For example, a value C(I, added) may be determined specifying the number of lines of code that have been added to construct C in order to implement issue I. Further, a value C(I, modified) specifying the number of lines of code of construct C that have been modified when implementing issue I may be determined. Additionally, a value C(I, removed) may specify the number of lines of code of construct C that have been removed in order to implement issue I. Alternatively, or in addition, a value C(I, edited) specifying the number of lines of code of construct C that have been edited when implementing issue I may be determined. The term "edited" denotes the sum of all above described operations, such as adding, modifying or removing code lines in order to implement issue I. The above-described parameters for specifying a modification of construct C in order to implement an issue I may be considered with respect to the whole history of the software system, with respect to a predetermined number of check-in procedures, or with respect to check-in procedures within a predetermined time period.

A value C(I, actual) summing-up the lines of code of construct C that contribute to the overall implementation of issue I may be determined. A line of code of construct C may contribute to the implementation of more than one issue I.

Further, a value C(I, actual, time) may be determined, specifying the number of lines of code of construct C contributing to an implementation of issue I from the beginning of the evolution of the software system to a certain point of time during the check-in history of the software system. The same mechanism based on time yields the values C(I, added, time), C(I, modified, time), C(I, removed, time) and C(I, edited, time).

Some lines of code that have been added with one check-in may have been modified or removed with a later check-in. Since C(I, added) just adds up the number of lines added over all check-ins, this value may differ and exceed the actual number of lines of code C(I, actual) that makes up the part of C that finally or at a certain point of time contribute to the implementation of issue I.

Figure 3:
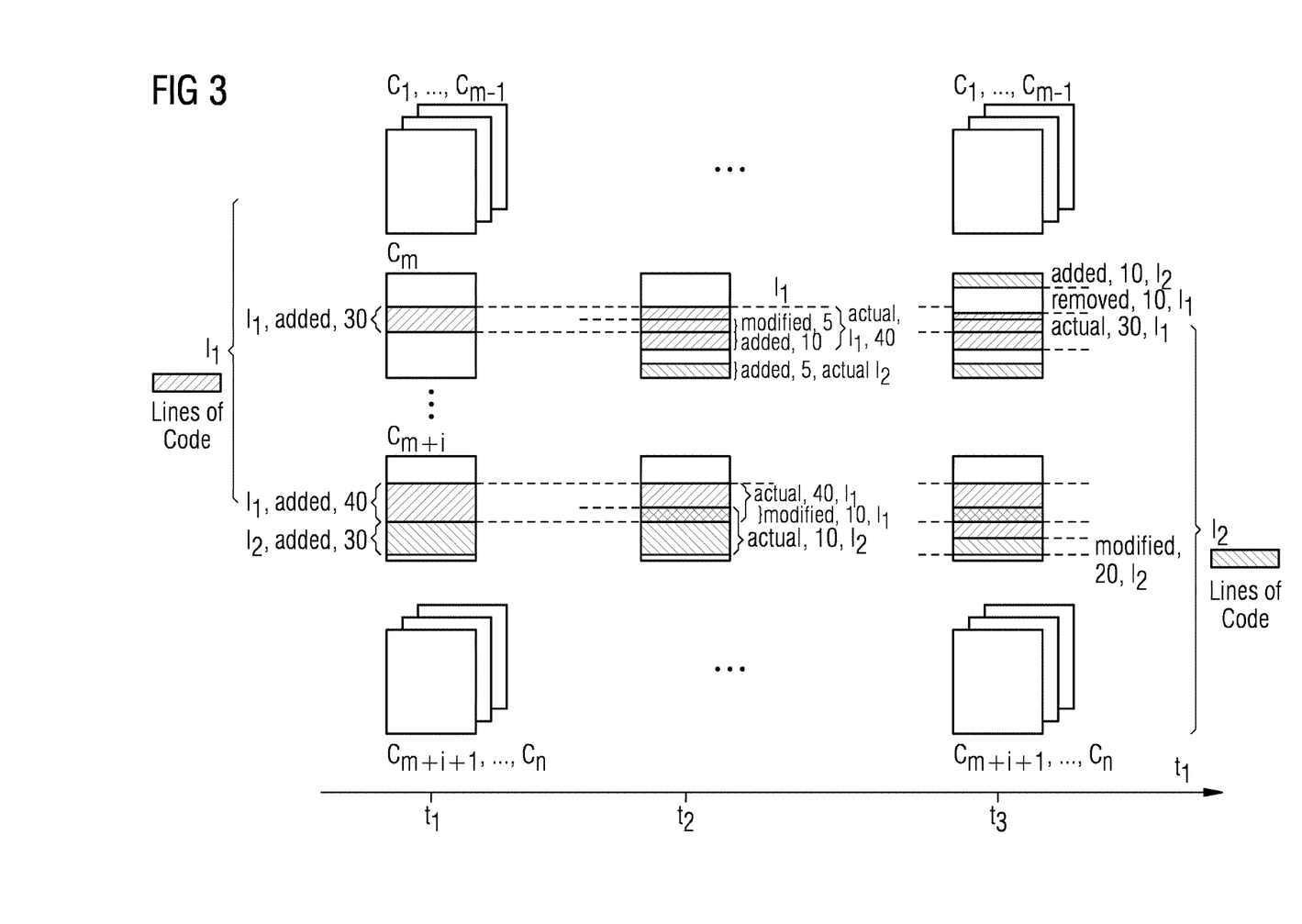
FIG. 3 shows exemplary amendments performed in the code base.

FIG. 3 illustrates an exemplary change of code lines in the constructs when working on two issues I1 and I2. The code base includes a plurality of constructs $C_1$ to $C_n$. At time t1, 30 lines of code are added to construct $C_m$, and 40 lines of code are added to construct $C_{m+i}$ in connection with the first issue I1. Additionally, 30 lines of code are added to construct $C_{m+i}$ for issue I2. Accordingly, there are the following parameters at time t1:

$$C_m(I1, \text{added}) = 30,$$

$$C_m(I2, \text{added}) = 0,$$

$$C_{m+i}(I1, \text{added}) = 40,$$

$$C_{m+i}(I2, \text{added}) = 30.$$

At time t2, in construct $C_m$, five lines of code are modified, and ten lines of code are added to construct $C_m$ for issue I1. Additionally, ten lines of code are modified in construct $C_{m+i}$ for issue I1. Further, five lines of code are added for issue I2 in construct $C_m$, and ten lines of code are added in construct $C_{m+i}$ for issue I2. Accordingly, at time t2, the following values may be determined:

$C_m(I1,\text{added})=30+10=40$, $C_m(I2,\text{added})=5$, $C_m(I1,\text{modified})=5$, $C_m(I2,\text{modified})=0$, $C_m(I1,\text{actual})=40$, $C_m(I2,\text{actual})=5$, $C_{m+i}(I1,\text{added})=40$, $C_{m+i}(I2,\text{added})=30+10=40$, $C_{m+i}(I1,\text{modified})=10$, $C_{m+i}(I2,\text{modified})=0$, $C_{m+i}(I1,\text{actual})=40$, $C_{m+i}(I2,\text{actual})=30+10=40$.

At time t3, ten lines of code are removed from construct $C_m$ for issue I1. In construct $C_{m+i}$, 20 lines of code are modified for issue I2. Accordingly, at time t3, the following values exist:

$C_m(I1,\text{added})=40$, $C_m(I2,\text{added})=10$, $C_m(I1,\text{removed})=10$, $C_m(I2,\text{removed})=0$, $C_m(I1,\text{modified})=0$, $C_m(I2,\text{modified})=0$, $C_m(I1,\text{actual})=40-10=30$, $C_m(I2,\text{actual})=5+10=15$, $C_{m+i}(I1,\text{added})=40$, $C_{m+i}(I2,\text{added})=40$, $C_{m+i}(I1,\text{modified})=10$, $C_{m+i}(I2,\text{modified})=20$, $C_{m+i}(I1,\text{actual})=40$, $C_{m+i}(I2,\text{actual})=40$.

The above described analysis of the changes in the number of code lines associated with the respective issues I1 and I2 may be performed by verification device 24b within the check-in device 24 of the managing apparatus 1. The determined values specifying the changes in the code line of the individual constructs C are stored in the additional tracking memory 13 of the managing apparatus 1.

Based on the information specifying the changes in the constructs in association with an issue vector, generating device 21 establishes the input vectors $V(I1,x)=(C_1(I1,x), \ldots, C_n(I1,x))$ and $V(I2,x)=(C_1(I2,x), \ldots, C_n(I2,x))$, where x is a value from the set {added, removed, edited, actual, (added, time), (removed, time), (edited, time), (actual, time) (actual, time)}. If additional changes are performed in connection with one or more further issues, additional vectors for all of those further issues may also be established.

Based on the established vectors, computing device 22 computes a statistical analysis of the respective vectors. For this purpose, the amendments of the constructs over the complete evolution of the software system may be considered. Alternatively, the status of the amendments at a certain point of time t may be considered by determining $V(I1,x,t)$ and $V(I2,x,t)$. After establishing the respective vectors, a statistical correlation of the vectors may be computed. Alternatively, other statistical functions may be applied. For example, a Pearson index $P(V(I1,x), V(I2,x), t)$ defining an angle between the two vectors may be computed. These statistical analyses are strong and reliable indicators to which extent two issue implementations are intermingled to each other (e.g., the implementations affect the same set of constructs to a large extent). Based on the computed statistical values, determining device 23 determines a degree of interdependence between the considered issues I1 and I2. This degree of interdependence is used to analyze the needed re-design and rework of the respective issues. An indication may be provided to the user, showing which issue is to be considered with high priority regarding rework. Further, determining device 23 may indicate to the user which constructs are affected by two or more intermingled issues (e.g., feature-to-feature, or feature-to-many bug fixes), and thus which constructs are to be adapted first.

In a further implementation, the analysis may take into account how many common constructs are affected by the issues I1 and I2 compared to the number of affected constructs by each issue. For example, a degree of interdependence between two issues I1 and I2 may be determined by multiplying the statistical value (e.g., the correlation) by a further factor $S(I1, I2)/S(I1)$. $S(I1)$ is the number of constructs affected by issue I1, and $S(I1, I2)$ is the number of constructs affected by both issues I1 and I2. The lower the ratio $S(I1, I2)/S(I1)$, the lower the degree of interdependence between issues I1 and I2.

In a further implementation, a statistical analysis like multiple regression analysis may be applied on all vectors $V(I1,x)$, $V(I2,x)$, with x taking two or more of the values {added, removed, edited, actual, (actual, time)}. Alternatively, a multiple regression analysis may be performed on more than two issues I1 ... In, and the degree of interdependence of more than two issues I1 ... In may be determined.

In a further implementation, the input vectors may be established based on the further aspects. For example, instead of analyzing the numbers of lines of code, the number of call dependencies may be analyzed to another issue J1. Such other issue J1 may be, for example, an architecture issue like an error handling class or an error handling package. Such an architecture issue may also be a multi-threading strategy or a persistence issue like an access to a database. Accordingly, each input vector $V(I,y)$ may be established as $V(I,y)=(C_1(I,y(J1)), \ldots, C_n(I,y(J1)))$. y denotes a value of the set {called class of J1; called class methods/functions of J1; or called architecture modules of J1}. In this way, two input vectors like V(I1,J1,y) and V(I1,J2,y) for two issues J1 and J2 may be established, and corresponding a correlation value may be computed. Alternatively, a multi-dimensional regression analysis may be performed over more than two issues I1, . . . , In to determine a measure of the coupling of two architecture concerns J1 and J2 over more than two issue implementations I1, . . . , In, or even over the whole code base. In one implementation, the issue I1 may be considered as being the whole code base of the software system, or the code base of a software component of the software system.

When considering architectural concerns J1 and J2, the architectural concerns J1 and J2 may be, for example, multithreading strategies, persistence (e.g., a call to a database), or a call to an error handling.

According to a further implementation, a statistical analysis may be performed to compare a call dependency density over constructs. Such a call dependency density analysis may be performed on constructs either on a fine granular or a coarse granular basis of several issues I1, . . . , In to one architectural issue J1. For example, an architectural issue J1 may be error handling. Other architectural issues (e.g., multithreading strategies or persistence) may also be provided. If it is known that issue I1 uses error handling or other architectural issues quite well within an implementation, a call dependency density vector V(I, J1, y) may be compared to further implementations I2, . . . , In and the respective vectors V(I2, J1, y), . . . , V(In, J1, y). These call density vectors and the respective distribution properties like expected value and standard deviation of a distribution D(I1, J1, y) are good reference values to compare the respective vectors and corresponding distributions.

Figure 4:
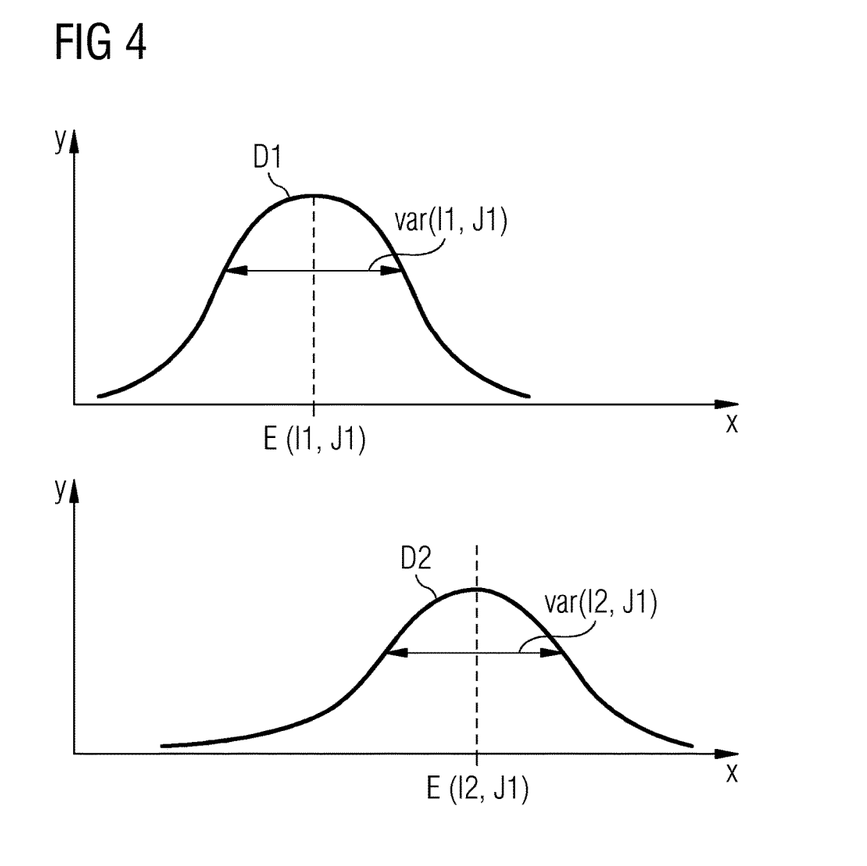
FIG. 4 shows a diagram comparing dependency functions according to a further exemplary embodiment.

FIG. 4 shows an exemplary diagram comparing two distributions D1, D2 of the respective dependency density vectors. In direction of the x-axis, the number of calls of an issue J1 is shown, and the y-axis specifies the number of constructs related to an issue I1 or I2 of an implementation calling the architectural issue J1. By comparing the expect values E(I1, J1) to E(I2, J1) and/or the variants var(I1, J1), var(I2, J1), whether issue I2 uses/calls the architectural issue J1 in a comparable way as I1 may also be determined. By comparing more than two density distributions, whether issue I2 uses/calls the architectural issue J1 in a comparable way as I1 even better may also be determined. As an example, take issue I1 as the set of all constructs of one software component, and J1 specifies the calls to the error handling package. If it is known that I1 is a quite robust software component that makes the right usage of error handling, whether issue I2 (e.g., all constructs of second software component) uses error handling to a similar degree as issue I1 may be determined.

Figure 5:
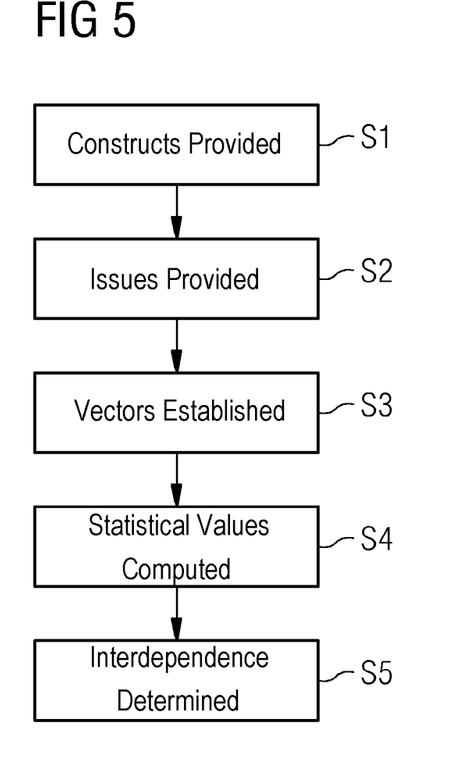
FIG. 5 shows a method for managing a software development and maintenance system according to a further exemplary embodiment.

FIG. 5 illustrates one embodiment of a method for managing a software development and maintenance system. In act S1, a set of constructs of a software code base is provided. Each construct is an element of a software code base of the software system. As already described above, different granularity levels may be applied for considering the software code base. In act S2, a set of issues is provided. Each issue specifies an implementation of software features or an architecture concern of the software code base. For example, an issue may be a specification for feature or requirement, or an identified bug that is to be fixed. An issue may also be an architectural concern (e.g., relating to multithreading strategies or persistence like database handling). An issue may also relate to error handling strategies.

In act S3, a set of vectors is established. Each vector specifies a dependency of the provided set of constructs relating to one of the issues provided in the set of issues. For this purpose, an analysis of the constructs with respect to the issues may be performed. For example, this analysis may determine the number of code lines relating to an issue. Alternatively, the relationship to a further issue (e.g., an issue relating to multithreading strategies, database calls (persistence) or error handling) may also be determined. Based on the established vectors, statistical values are computed in act S4. These statistical values may be, for example, correlations between the established vectors or a Pearson index. In act S5, a degree of interdependence between the issues is determined by using the computed statistical values.

Summarizing, one or more of the present embodiments provide a management apparatus and method for managing a software development and maintenance system. In order to improve the software quality, to reduce the number of errors and to prioritize the work on the software system, an analysis of the individual parts of the code base and the related functional and/or architectural concerns is performed.

By determining a degree of interdependence between the functional/architectural concerns of the software system, a relationship between functional features and implementations of the functional features may be determined. How far feature implementations are intermingled to each other and which implementations are to be considered firstly may be determined. Hardly maintainable features may be identified, and recommendations for improving the software system may be automatically evaluated. Additionally, the development and maintenance of the software system may be controlled in order to identify elements of the code base that are to be re-designed.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A managing apparatus for managing a software development and maintenance system, the managing apparatus comprising:
an issue memory configured to store a set of issues, each issue of the set of issues specifying an implementation of software feature or a bug fix of a software code base of a software system;
a construct memory configured to store a set of constructs, each construct of the set of constructs being an implementation of an issue and an element of the software code base of the software system;

an issue vector generating device configured to establish a set of issue vectors, wherein each element of an issue vector of the set of issue vectors specifies changes of a construct of the stored set of constructs in association with at least one issue of the stored set of issues;

a computing device configured to compute a statistical value using the established set of issue vectors; and a determining device configured to determine a relationship between an issue and implementation of the issue, the determination of the relationship comprising determination of a degree of interdependence between two issues of the set of issues, the determination of the degree of interdependence comprising indication, based on the computed statistical value, to which extent implementations of the two issues are intermingled with each other, such that the implementations affect the same set of constructs to an extent that is defined by a statistical correlation or a Pearson index of the established set of issue vectors.

2. The management apparatus of claim 1, further comprising:

a check-in device comprising:
  a receiver configured for receiving a construct and for determining issue information specifying an issue associated with the received construct;
  a verifying device configured for:
    comparing the received construct with a version of the construct stored in the construct memory; and
    identifying an amendment between the received construct and a stored former version of the construct; and
  a tracking memory configured for:
    storing the determined issue information; and
    storing the identified amendment between the received construct and the stored former version of the respective construct,
  wherein the check-in device is configured to store the received construct in the construct memory.

3. The management apparatus of claim 2, wherein the verifying device is configured to determine lines of code that have been added, modified, removed, or a combination thereof in the received construct.

4. The management apparatus of claim 2, wherein the receiver is configured to receive a plurality of constructs associated with a single issue, and the verifying device is configured to determine which constructs have been amended for the associated issue.

5. The management apparatus of claim 3, wherein the receiver is configured to receive a plurality of constructs associated with a single issue, and the verifying device is configured to determine which constructs have been amended for the associated issue.

6. A method for managing a software development and maintenance system, the method comprising:

providing a set of issues, each issue of the set of issues specifying an implementation of software feature or a bug fix of a software code base of a software system;

providing a set of constructs of a software code base, each construct of the set of constructs being an implementation of an issue and an element of the software code base;

establishing a set of issue vectors, wherein each element of the issue vector of the set of issue vectors specifies changes of a construct of the provided set of constructs in association with at least one issue provided in the set of issues;

computing, with a processor, statistical values between the established set of issue vectors; and determining a relationship between an issue and implementation of the issue, the determining of the relationship comprising determining a degree of interdependence between two issues of the set of issues, the determining of the degree of interdependence comprising indicating, based on the computed statistical values, to which extent implementations of the two issues are intermingled with each other, such that the implementations affect the same set of constructs to an extent that is defined by a statistical correlation or a Pearson index of the established set of issue vectors.

7. The method of claim 6, wherein the establishing comprises determining a number of constructs being affected by the respective one issue of the set of issues, and wherein the determining comprises determining the degree of interdependence using the determined number of constructs being affected by the respective one issue.

8. The method of claim 6, wherein the computing comprises computing a statistical correlation or a Pearson index of two established issue vectors of the set of issue vectors.

9. The method of claim 6, wherein the computing comprises a multiple regression analysis.

10. The method of claim 6, wherein each issue of the set of issues is an implementation of error handling, persistence, multi-thread strategies, or a combination thereof.

11. The method of claim 6, wherein the set of constructs is a set of files, directories, sub-directories, namespaces, classes or class methods/functions.

12. The method of claim 7, wherein the computing comprises computing a statistical correlation or a Pearson index of two established issue vectors of the set of issue vectors.

13. The method of claim 7, wherein the computing comprises a multiple regression analysis.

14. The method of claim 7, wherein each issue of the set of issues is an implementation of error handling, persistence, multi-thread strategies, or a combination thereof.

15. The method of claim 8, wherein each issue of the set of issues is an implementation of error handling, persistence, multi-thread strategies, or a combination thereof.

16. The method of claim 9, wherein each issue of the set of issues is an implementation of error handling, persistence, multi-thread strategies, or a combination thereof.

17. The method of claim 7, wherein the set of constructs is a set of files, directories, sub-directories, namespaces, classes, or class methods/functions.

18. The method of claim 7, wherein the set of constructs is a set of files, directories, sub-directories, namespaces, classes or class methods/functions.

19. The method of claim 8, wherein the set of constructs is a set of files, directories, sub-directories, namespaces, classes, or class methods/functions.

20. The method of claim 9, wherein the set of constructs is a set of files, directories, sub-directories, namespaces, classes, or class methods/functions.

21. A computer program product for managing a software development and maintenance system, the computer program product comprising:

a non-transitory computer-readable storage device having computer-readable program instructions stored therein, the computer-readable program instructions being executable by a processor to:

provide a set of issues, each issue of the set of issues specifying an implementation of software feature or a bug fix of a software code base of a software system;

provide a set of constructs of a software code base, each construct of the set of constructs being an implementation of an issue and an element of the software code base;

establish a set of issue vectors, wherein each element of the issue vector of the set of issue vectors specifies changes of a construct of the provided set of constructs in association with at least one issue provided in the set of issues;

compute statistical values between the established set of issue vectors; and determine a relationship between an issue and implementation of the issue, the determination of the relationship comprising determination of a degree of interdependence between two issues of the set of issues, the determination of the degree of interdependence comprising indication, based on the computed statistical values, to which extent implementations of the two issues are intermingled with each other, such that the implementations affect the same set of constructs to an extent that is defined by a statistical correlation or a Pearson index of the established set of issue vectors.

* * * * *